Feb. 12, 1935.  E. R. CHILD  1,990,978
IRREVERSIBLE CONTROL
Filed Aug. 2, 1933
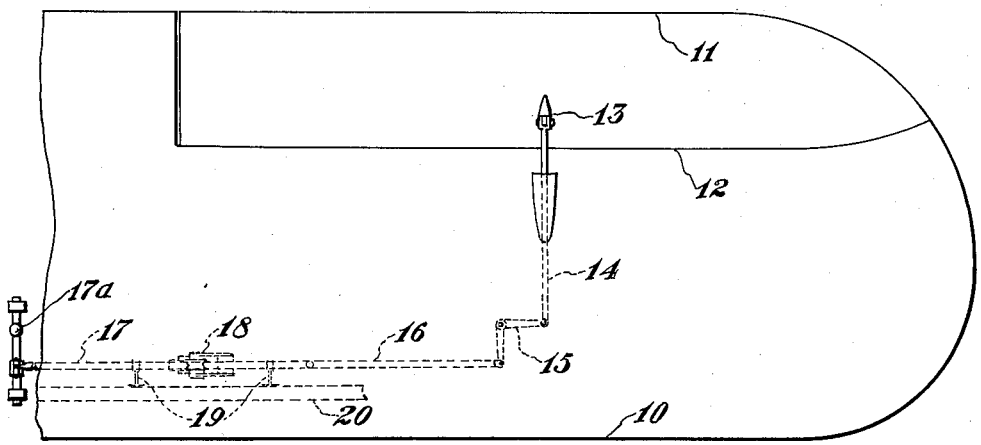
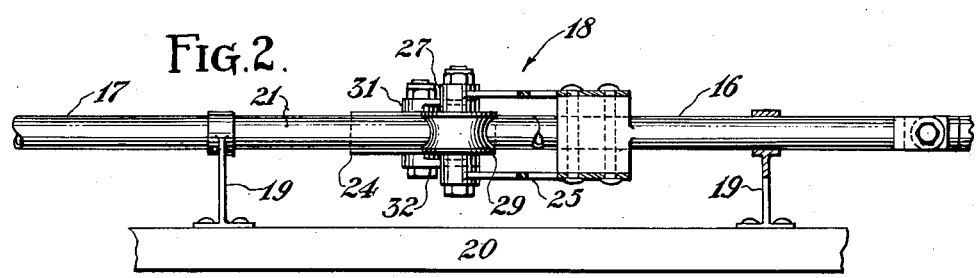
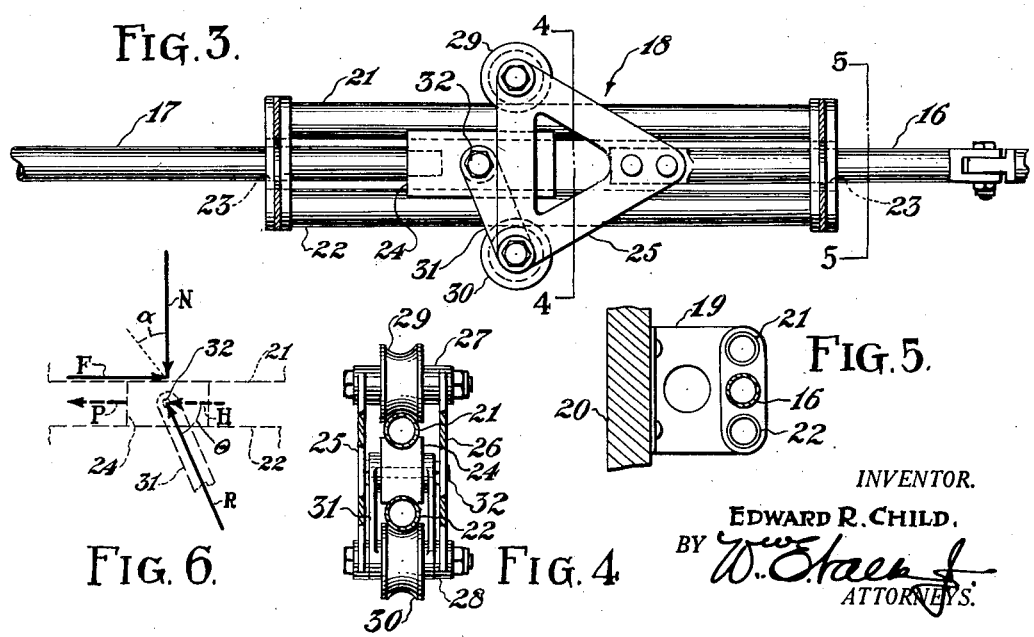
INVENTOR.
EDWARD R. CHILD.

Patented Feb. 12, 1935

1,990,978

UNITED STATES PATENT OFFICE 1,990,978

IRREVERSIBLE CONTROL

Edward R. Child, Kenmore, N. Y., assignor to Curtiss Aeroplane & Motor Company, Inc., a corporation of New York Application August 2, 1933, Serial No. 683,272

10 Claims. (Cl. 244—29)

This invention relates to aircraft control systems, and particularly to irreversible mechanisms interposed in the control connections of such a system.

In that type of control mechanism wherein a push-pull rod is adapted to be moved to control other elements, it is frequently desirable to provide means whereby operation of the rod may effect movement in the controlled members, but wherein forces applied upon controlled members are prevented from reacting into the control rod. Such mechanism may be utilized in connection with the controls of aircraft, particularly in the mechanism provided for operating the ailerons of an aircraft. It has been found that under certain circumstances, the ailerons of an aircraft are apt to flutter, due to the action of the air forces upon them, such flutter being harmful in that it interferes with proper control of the aircraft, and may cause high stresses in the structure with the possibility of effecting a failure of parts. Flutter may be prevented by eliminating the possibility of inadvertent movement of the ailerons and controlled members, by the use of an irreversible mechanism in the control system.

An object of the invention is to provide an irreversible control mechanism.

A further object is to provide irreversible means which may be incorporated in a push-pull control system.

Another object of the invention is to provide means for eliminating flutter in aircraft control surfaces.

Still another object is to provide an irreversible control mechanism which may be readily incorporated in the control system of an airplane.

A further object is to provide friction means for preventing the inadvertent movement of a controlled member due to external stresses imposed thereon.

Still another object is to provide an irreversible mechanism for use in connection with a push-pull control system, which is extremely simple in operation, which is light in weight, and which may be readily incorporated in an existing push-pull control system.

Briefly, the invention includes an irreversible mechanism interposed in a control connection joining an aircraft control surface with a control device. Said mechanism comprises a pair of spaced parallel guides between which a control rod is adapted to slide. A block is carried at an end of the control rod which may frictionally engage one or the other of said guides. A controlled member or rod is also adapted to slide with respect to said parallel guides, and carries rollers or other anti-friction devices to engage said guides and to constrain the controlled member to parallel movement along said guides. An angled link connects the friction block with the controlled member, and is pivoted to said block and to said member. The angular relationship of the link with respect to the balance of the mechanism is such that it transmits motion of the control rod to the controlled member, but prevents transmission of motion of either the rod or the member in the reverse direction by jamming the friction block against the guides. For a clearer understanding of the operation of the invention, reference may be made to the annexed drawing, in which:

Fig. 1 is a plan of an aircraft wing showing the relationship of the invention to an aileron and an aileron control system;

Fig. 2 is an enlarged plan of the irreversible control mechanism;

Fig. 3 is a side elevation of the irreversible control mechanism;

Fig. 4 is a section on the line 4—4 of Fig. 3;

Fig. 5 is a section on the line 5—5 of Fig. 3; and

Fig. 6 is a diagram showing the distribution of forces on the irreversible mechanism.

Fig. 1 shows a wing 10 having an aileron 11 hinged thereto along the line 12. The aileron carries a horn 13 to which is pivoted a tube 14, which by fore and aft movement, may change the angular relationship of the aileron 11 with respect to the wing 10. Movement of the tube 14 is effected through a bell crank 15, to which is pivoted a controlled member 16. The controlled member 16 is connected with a control rod 17 through an irreversible mechanism 18 carried in brackets 19 attached to the wing spar 20. The control rod 17 is pivoted to a control stick 17a in any well known manner, so that operation of the stick 17a results in actuation of the aileron 11 for control of the aircraft. Referring to Figs. 2 to 5, the mechanism 18 comprises a pair of spaced parallel guides or tracks 21 and 22 carried by the brackets 19, the latter being provided with openings 23 through which the rod 17 and the controlled member 16 are adapted to slide in parallel relationship with the guides 21 and 22. At the end of the rod 17, a bearing block or shoe 24 is rigidly attached, the side faces of this block being formed to lie closely adjacent the guides 21 and 22. Frictional material such as brake lining, or the like, may be attached to the side faces of the block 24, so that a high coefficient of friction may inhere when the block 24 engages with one or the other of the guides. The controlled member 16 terminates a short distance from the inner end of the block 24, and has attached thereto a pair of triangular plates 25 and 26. The outer corners of these triangular plates, which embrace the tracks 21 and 22, are joined by bushings 27 and 28 on which rollers 29 and 30 are carried to engage the outer surfaces of the guides 21 and 22, thereby allowing the controlled member 16, by itself, to be freely movable with respect to the guides 21 and 22. The bushing 28 carries a freely swingable arm or link 31, extending inwardly around the guide 22, and pivoted to the block 24 as at 32. The link 31 is acutely angled with respect to the axis of the rod 17, the controlled member 16, and likewise with respect to the guides 21 and 22. Clearances in the several pivots and between the several elements are kept rather close so that, upon operation of the device, the angularity of the link 31 with respect to the other parts changes but little.

Operation of the device, which will be later analyzed in detail, is broadly as follows: Pushing of the rod 17 toward the right, for instance, imposes a force on the link 31. The force is transmitted through the link 31 to the plates 25 and thence to the controlled member 16, to effect movement of the member 16 and of the parts to which the member is connected. Reverse operation, wherein a force is applied through the controlled member 16 to the mechanism, is prevented, since such reverse force imposes a force upon the link 31 which presses the block 24 against the guide 21 or the guide 22, thereby frictionally binding said block against the guide to prevent any movement of the member 16 or of the control rod 17. Forces may be applied in either direction on the rod 17 to cause movement of the controlled member 16, but forces in either direction applied on the controlled member 16 fail to produce any movement in the control rod 17, and likewise, hold the member 16 from movement.

A basic requirement in the design of this mechanism is a proper relationship between the angle which the link 31 makes with the other members and the coefficient of friction between the block 24 and the guides 21 and 22. This relationship basically is that the tangent of the angle which the link 31 makes with the axis of the rod 17 be greater than the reciprocal of the coefficient of friction between the block 24 and the guides 21 and 22. Expressed in another way, the cotangent of the angle must be less than the coefficient of friction.

An analysis of the forces applied on the mechanism will assist in clarifying the operation thereof, and reference may be made to Fig. 6, wherein a compressive force R, acting through the link 31, is imposed upon the pivot 32. This force R is the resultant of a force applied in the controlled member 16 tending to cause reverse movement of the mechanism. This force R resolves into a horizontal component H, tending to move the block 24 reversely, or to the left, and likewise resolves into a vertical component which is opposed by a vertical force N acting against the block. The force N is that which determines the frictional resistance of the block against the guide 21, and engenders a frictional force F which resists movement of the block. The coefficient of friction between the block 24 and the guide 21, represented by the letter $f$, is equal to $$\frac{F}{N}$$

which coefficient is likewise equal to the tangent of the friction angle $\alpha$.

It is necessary, in order that the device be operated as intended, that the angle $\theta$ between the link 31 and the rod axis be greater than the complement of the friction angle $\alpha$. By this relationship, the horizontal component H of the applied force R will always be less than the friction force F, and hence, movement of the block is prevented. If an additional force P is applied to the block along the axis of the rod 17, the difference between or the sum of the force F and the force H may be overcome to cause movement of the block 24 along the guides 21 and 22 with resultant movement of the controlled member 16. The force R may be applied in either direction with the same result, namely, binding of the block 24 against the guides 21 or 22 to prevent movement thereof. The force P may be applied in either direction, in a degree sufficient to overcome either the sum or difference of the forces F and H to cause movement of the block in either direction, regardless of the direction of action of the force R.

The above described relationship of the angles $\theta$ and $\alpha$ resolves into the fact that the available force F must be greater than the horizontal component H of the applied force R, which is embraced by the relation $$\text{Tan } \theta > \frac{1}{f}.$$

This may also be stated by the expression $\text{Cot } \theta < f$.

As an example, assuming a coefficient of friction of .50, which may be typical of a dry brake lining against dry steel, the cotangent of the angle $\theta$ must be less than .50, and hence the angle $\theta$ must be greater than approximately 63.5°.

It will be appreciated that the smaller the divergence between the coefficient of friction F and the cotangent of the angle $\theta$, the less force P will have to be applied along the axis of the control rod 17 to cause movement of the controlled member 16. On the other hand, sufficient divergence should be allowed between the above named quantities so that variations in the coefficient of friction may occur without affecting the locking properties of the mechanism.

It will be appreciated that the irreversible mechanism above described is by no means limited in its application to aircraft control systems, but may be used in other applications.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a control system having a control rod and a controlled member, a fixed track, a shoe carried by said rod and slidable along said track, and a pivoted link connecting said controlled member with said rod, said link being so positioned relative to said rod that a line joining the pivots thereon makes an acute angle with said rod.

2. In a control system, a track, a control rod having a block adapted to slide along and frictionally engage said track, a controlled member slidable along said track, and a link pivoted to said control rod and to said controlled member.

3. In a control system, a track, a control rod having a block adapted to slide along and frictionally engage said track, a controlled member slidable along said track, and a link pivoted to said control rod and to said controlled member, said link being arranged to make an acute angle with said track.

4. In an irreversible control mechanism, a track, a control rod having a block for frictionally engaging said track, a controlled member, and a link pivoted to said control rod and to said member, a line through said pivots making, with the axis of said rod, an angle whose cotangent is less than the coefficient of friction between said block and said track.

5. In an irreversible control mechanism, a track, a control rod having a block for frictionally engaging said track, and a controlled element pivoted to said control rod and constrained to move therewith, said element making, with said rod, an angle whose cotangent is less than the coefficient of friction between said block and said track.

6. In an irreversible control mechanism having a control rod and a controlled member, a block carried by said control member, a pair of spaced parallel tracks between which said block is adapted to slide and with one or the other of which said block may frictionally engage, a controlled member having track engaging means, and an angled link pivotally connecting said block and said controlled member, the angle between said link and the line of travel of said block along said track having a cotangent less than the coefficient of friction between said block and said track.

7. In an irreversible control mechanism having a control rod and a controlled member, a track along which said rod and said member are constrained to slide and with which said rod may frictionally engage, and an angled link articulated to said rod and to said member, said link making with said track an angle whose tangent is greater than the reciprocal of the coefficient of friction between said rod and said track.

8. In an irreversible control mechanism, a controlled member, a guide for said member, frictional means engageable with said guide, an element responsive in its action to forces applied to said member for causing engagement of said frictional means with said guide to prevent movement of said member, and a control rod connected to said member adapted to have a force applied thereto for overcoming said frictional means and for moving said member.

9. In an irreversible control mechanism for aircraft controls including a track, a control element slidable along and adapted to frictionally engage said track, and a controlled member pivoted to said element and constrained to move therewith, said member being angularly organized relative to said track in such manner that the line of forced application from said pivot through said member makes an angle with said track whose cotangent is less than the coefficient of friction between said element and said track.

10. In an irreversible control mechanism for aircraft controls including a track, a control element slidable along and adapted to frictionally engage said track, a controlled member pivoted to said element, and means for constraining said member at all times to an angle with said track whose cotangent is less than the coefficient of friction between said element and said track.

EDWARD R. CHILD.